United States Patent

Chan et al.

Patent Number: 6,009,220
Date of Patent: Dec. 28, 1999

[54] SURVEILLANCE SYSTEM FOR PASSIVE BRANCHED OPTICAL NETWORKS

[76] Inventors: Chun-Kit Chan, Rm 1207, Wah Sang House, Wah Fu Estate, The Hong Kong Special Administrative Region of the People's Republic of China; Lian-Kuan Chen, 23B, Block 13, City One, Shatin, N.T., The Hong Kong Special Administrative Region of the People's Republic of China; Frank F. K. Tong, UR14 Flat 5A, The Chinese University of Hong Kong, Shatin, The Hong Kong Special Administrative Region of the People's Republic of China; Dennis K. W. Lam, Patios 5 Bangai, 418 12 Utase, 2 Chome, Mihama-ku, Chiba, Japan

[21] Appl. No.: 08/989,921

[22] Filed: Dec. 12, 1997

[30] Foreign Application Priority Data

Jan. 15, 1997 [CA] Canada ................................. 2195153

[51] Int. Cl.⁶ ............................. G02B 6/28; H04B 10/08
[52] U.S. Cl. ............................. 385/24; 359/110; 385/37
[58] Field of Search ................................. 385/24, 37, 12; 359/110

[56] References Cited

U.S. PATENT DOCUMENTS

| | | | |
|---|---|---|---|
| 5,329,392 | 7/1994 | Cohen | 359/124 |
| 5,446,809 | 8/1995 | Fritz et al. | 385/17 |
| 5,530,666 | 6/1996 | Kashyap et al. | 365/123 |
| 5,570,440 | 10/1996 | Mizrahi | 385/37 |
| 5,771,250 | 6/1998 | Shigehara et al. | 372/6 |
| 5,774,606 | 6/1998 | De Barros et al. | 385/24 |
| 5,907,417 | 5/1999 | Darcie et al. | 359/110 |

OTHER PUBLICATIONS

OFC 1996 Technical Digest, Optical Fiber Identification System Using Fiber Bragg Gratings, Shigehara et al, 1996.

A Passive Surveillance Scheme for Passive Branched Optical Networks C.K. Chan; F. Tong; L.K. Cheng; J. Song; D. Lam OFC'97 Dallax, TX, Paper TuK1 (1997).

A Practical Passive Surveillance Scheme for Optically–Amplified Passive Branched Optical Networks C.K. Chan; F. Tong; L.K. Chen; J.Song; Dn. Lam IEEE Photonics Technology Letters, 1997.

Fault Location Technique for In–Service Branched Optical Fiber Networks I. Sankawa; S.I. Furukawa; Y. Koyamada; H. Izumita IEEE Photonics Technology Letters vol. 2 No. 10, Oct. 1990.

Measuring the Individual Attenuation Distribution of Passive Branched Optical Networks K. Tanaka, M. Tateda, Y. Inoue IEEE Photonics Technology Letters vol. 8, No. 7, Jul. 1996.

Recent progress in OTDR technologies for maintaining optical fiber networks Y. Koyamada, T. Horiguchi, S. Furukawa IOOC 1995.

Fault–Locating and Supervisory Technique for Multistaged Branced Optical Networks Y.K. Chen, S. Chi IEEE Photonics Technology Letters, vol. 6, No. 7, Jul. 1991.

(List continued on next page.)

*Primary Examiner*—John D. Lee
*Assistant Examiner*—Juliana K. Kang
*Attorney, Agent, or Firm*—Lacasse & Associates; Randy W. Lacasse; Wesley L. Strickland

[57] ABSTRACT

A surveillance system for in-service fault identification in an amplified passive branched optical network is provided. This system does not require any wavelength tunable light source as used in multi-wavelength OTDR. Fiber-Bragg gratings are placed at some strategic positions on different fiber branches to slice and reflect the optical amplifier's residual ASE power at some wavelength other than the signal wavelengths. The conditions of the fiber link and optical amplifier at each branch can be monitored by constantly checking the reflected power level of the corresponding wavelength without suspending the in-service channels.

8 Claims, 6 Drawing Sheets

OTHER PUBLICATIONS

In–service Remote Access and Measureent Systemf or Passive Double Star Networks F. Yamamoto, I. Sankawa, S. Furukawa, Y. Koyamada Journal of Optical Communications (1995).

Optical Fiber Identification Using Rayleigh Backscattred Light T. Kuwabara, H. Koga, Y. Kato, Y. Mistunaga IEEE Photonics Technology Letters, vol. 4, No. 7, Jul. 1992.

Characterization of a 16–Channel Optical/Electronic Selector for Fast Packet–Switched WDMA Networks F. Tong, C.S. Li, A.E. Stegvens, Y.H. Kwark IEEE Photonics Technology Letters, vol. 6, No. 8, Aug. 1994.

Characterization of a variable bit–rate receiver for applications in WDM/WDMA systems F. Tong, C.S. Li, G. Berkowitz OFC ' 96 Technical Digest (1996).

SURVEILLANCE SYSTEM FOR PASSIVE BRANCHED OPTICAL NETWORKS

FIELD OF THE INVENTION

This invention relates to optical test apparatus, and in particular to an apparatus for detecting and monitoring losses and/or faults in optical fibres. The invention also provides a means of testing optical networks.

BACKGROUND OF THE INVENTION

It is well known that faults in optical fibres can be located by an optical time domain reflectometer (OTDR). An OTDR typically launches a pulse of light into an optical fibre, and backscattered light is monitored for abrupt changes indicative of a loss or fault. The distance of the loss or fault from the launch end of the fibre can be determined from the time interval between the launch and the return of the backscattered peak. Once a period of time sufficient to receive all detectable backscattered light has passed, a further pulse may be launched into the fibre. The pulse width may be varied for different dynamic range or resolution requirements. Thus, for a given amplitude, an increase in the pulse width enables a greater length of fibre to be monitored, that is to say it increases the dynamic range of the OTDR. The dynamic range of an OTDR is the loss after which an event, backscatter or reflection can still be detected.

The OTDR is an extremely useful form of optical test equipment since, from connection to a single end of an optical fibre network, the location of losses and reflections can be determined, and their amplitude measured, to a high degree of accuracy. For loss measurements, both point-losses and end-to-end fibre or network losses can be measured. In duplex networks, the amplitude of any reflections is important, since these may cause crosstalk. In some known schemes it is possible using wavelength division multiplexing (WDM) techniques, to take these measurements at a particular wavelength i.e. 1650 nm whilst the network is carrying data at another wavelength i.e. 1550 nm.

As of late, there has been a demand for an OTDR system that conveniently and inexpensively allows for the reliability testing of individual optical fibres within optical networks of optical fibers. Methods used heretofore in conventional OTDR are not suitable, since the Rayleigh back-scattered light from different branches cannot be differentiated at the OTDR. Notwithstanding, recently, several methods based on multi-wavelength OTDR have been proposed in:

a paper by I. Sankawa, "Fault Location Technique for In-Service Branched Optical Fiber Networks", published in IEEE Photon. Technol. Lett., vol. 2, no 10, pp 766–768, 1990;

a paper by Y. Koyamada, et al, entitled "Recent Progress in OTDR Technologies for Maintaining Optical fiber Networks", IOOC'95, Paper FA1-4, Hong Kong, 1995.

a paper by K. Tanaka, et al, "Measuring the Individual Attention Distribution of Passive Branched Optical Networks", IEEE Photon. Technol. Lett., vol. 8, no. 7, pp. 915–917, 1966; and, a paper by M. Shigehara, et al., "Optical Fiber Identification System Using Fiber Bragg Gratings", Technical Digest, OFC'96 Paper WK13, San Jose, 1966; all of which are incorporated herein by reference.

However, these proposed OTDR systems require a wavelength-tunable pulsed light source for the test signals and thus impose high cost and complexity. For the schemes proposed by Sankawa, and Koyamada et al., strong monitoring signals from the wavelength-tunable light sources may deplete the gain of the in-line optical amplifiers and result in system penalty; whereas this invention, in contrast provides an in-service fault detection system using optical amplifiers on passive branched optical networks (PBONs) and on a concatentated link without requiring an extra light source.

Two known systems that address OTDR in optical networks are disclosed in U.S. Pat. Nos. 5,491,573 and 5,491,574 in the name of Shipley. Another United States patent in the same field is U.S. Pat. No. 5,329,392 in the name of Cohen. In view of the limitations of these aforementioned inventions, it is an object of one aspect of this invention to provide a novel passive surveillance scheme for fault identification in optically-amplified PBON using fiber Bragg gratings (FBG) without using any extra light source for the test signals. The invention further obviates the use of a tunable OTDR pulsed light source.

It is a further object of the invention to provide an inexpensive device for testing an optical network of waveguides in the presence of traffic.

More generally, it is an object of this invention to provide a passive surveillance system that is compatible with the use of optical amplifiers and which utilizes otherwise unused spectrum provided by a rare earth doped optical amplifier.

SUMMARY OF THE INVENTION

In accordance with one aspect of the invention, a surveillance scheme for in-service fault identification in optically amplified passive branched optical networks and concatentated links is provided. In a preferred embodiment fiber Bragg gratings are disposed at strategic positions on different fiber branches to slice and reflect the optical amplifier's residual amplified spontaneous emission (ASE) power at some wavelengths other than at signal or traffic wavelengths. In yet another embodiment fiber Bragg gratings are disposed at strategic positions along a waveguide to slice and reflect the optical amplifier's residual ASE power at some wavelengths other than at signal or traffic wavelengths.

In accordance with another broad aspect of the invention, in an optically-amplified passive branched optical network having a plurality of optical branch paths each path having a fiber Bragg grating for passing traffic signal wavelengths of light and reflecting other test wavelengths of light, a surveillance method is provided for in-service fault identification. The method comprises the steps of: monitoring the optically-amplified passive branched optical network to detect the test wavelengths of light, wherein the test wavelengths of light are generated by the amplifier and are confined to its normally unused portion of its amplifying spectrum outside of the wavelengths of traffic signal wavelengths.

In accordance with another broad aspect of the invention a broad band light source is provided having a plurality of test wavelengths of light. Light centered at these test wavelengths is launched into an optical network having fiber Bragg gratings at branch paths or on concatenated paths. Fiber Bragg gratings on different branch paths are designed to reflect different test wavelengths backwards to a receiver and detection circuit optically coupled to a main trunk. The amplitudes of the reflected test wavelengths of light are continuously monitored to determine if a fault exists on a particular branch. Conveniently, by providing a constant beam of test wavelengths of light having wavelengths that are different than those for normal data transmission, monitoring can occur continuously along with data transmission on the same optical branch paths.

In accordance with yet one other aspect of the invention, a method and system for retrofitting an existing optical fibre network with fault detection means is provided. The method comprises the steps of in-situ provision of fiber in-line Bragg gratings at predetermined locations on predetermined optical waveguides disposed within the network; and further comprising the steps of providing a broadband light source preferably in the form of an ASE power spectrum associated with an optical amplifier in the network; and, detecting signal levels of test signals reflected from the in-line fiber Bragg gratings.

BRIEF DESCRIPTION OF THE DRAWINGS

Embodiments of the invention will now be described in conjunction with the drawings, in which.

DETAILED DESCRIPTION

Figure 1A:
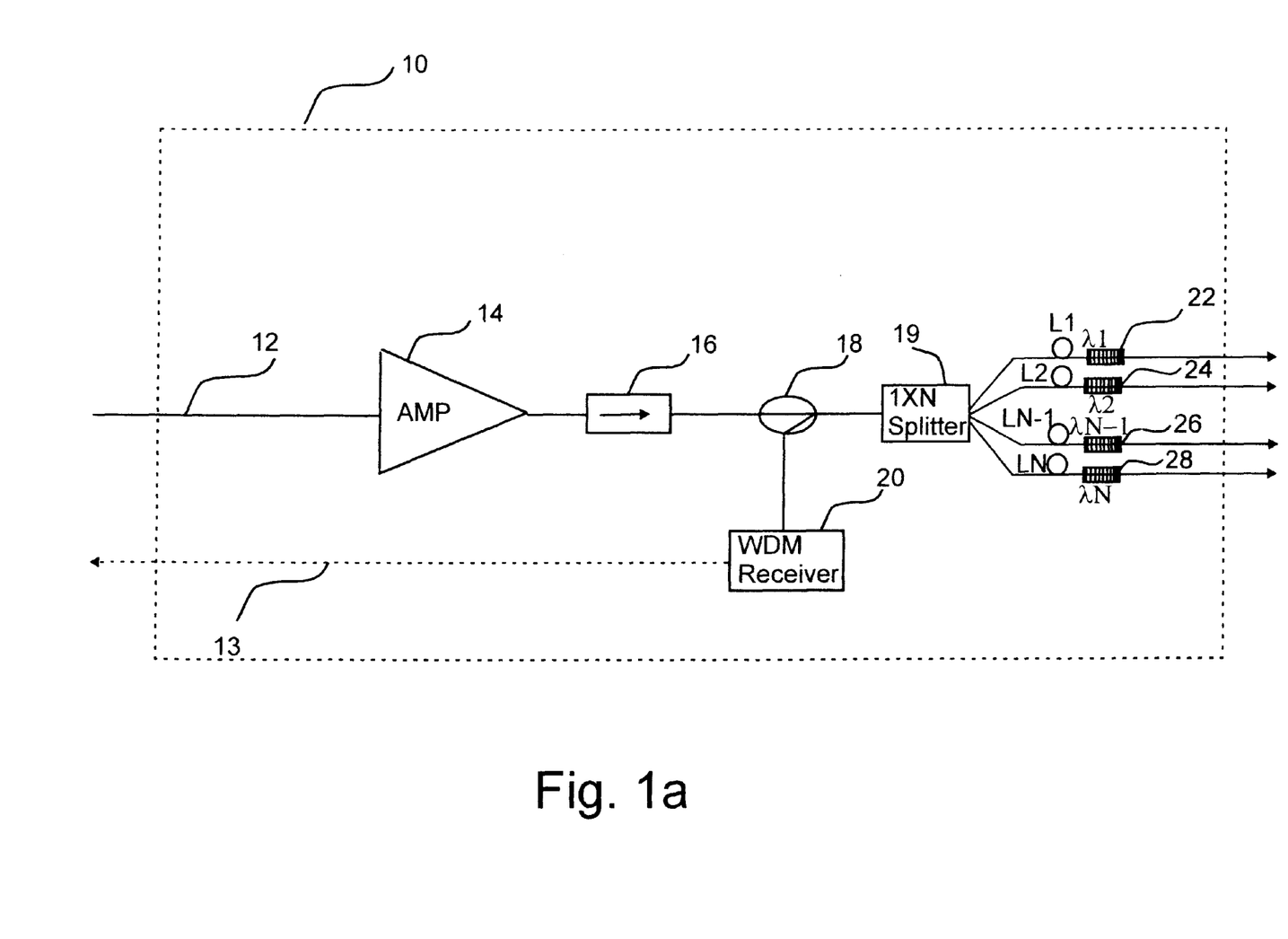
FIG. 1a is a circuit diagram of a surveillance scheme of a 1×N stage system in accordance with the invention.

Referring now to FIG. 1a, a network is shown having an input path 12 coupled to an erbium doped fiber amplifier (EDFA) 14. An optical isolator 16 is coupled to the output of the EDFA 14 for preventing unwanted back reflections from entering the output end of the amplifier. A 3-port optical circulator 18, via ports 1 and 2, optically couples light exiting the isolator 16 with a 1×N splitter 19 which splits an input optical signal into N signals paths. Alternatively, the optical circulator 18 can be replaced with an optical coupler (not shown). Further, when the optical circulator 18 is used in place of an optical coupler, the optical isolator 16 may in some instances be removed where adequate isolation is provided by the circulator 18. As is shown in the example of the figure, the signal paths are of varying lengths L1=4.4 km, L2=8.8 km, . . . LN−1 and LN. The N optical signal paths are equipped to be monitored and each have a fiber Bragg grating (FBG) designed to reflect a different wavelength of incident light in the form of a unique test signal backwards towards the optical circulator 18. For example the grating 22 is designed to reflect light of wavelength $\lambda 1$ backwards and to pass light of other wavelengths of light incident upon it; the second grating 24 is designed to reflect light of wavelength $\lambda 2$ incident upon it, and to pass other wavelengths of light. A wavelength division multiplexing (WDM) receiver 20 is coupled to port 3 of the optical circulator 18 for receiving and detecting signal strength of reflected ASE light reflected from any of the gratings 22 . . . 28.

In operation the EDFA's 14 residual amplified spontaneous emission (ASE) power is utilized as a broadband light source to provide constant monitoring signals. The fiber Bragg gratings 22, 24 . . . 28 are placed at strategic, predetermined locations on different branches for example grating 22 on a first branch, grating 24 on a second branch, an so on, and are used to "slice and reflect" the ASE power at wavelengths outside the signal/traffic wavelengths of (1525–1540 nm and 1556–1566 nm). Since each FBG is designed to reflect a different centre wavelength, each of the N-branches can be monitored constantly and simultaneously by detecting the reflected power level of the corresponding wavelength without suspending or adversely affecting the in service data channels.

By way of example, the following experiment was performed wherein FBGs were designed to have centre wavelengths for $\lambda 1$ and $\lambda 2$ equal to 1557.5 nm and 1559 nm respectively. Branches N−1 and N for this 4 branch experiment were left unmonitored. The 3-dB bandwidth and reflectivity of each FBG was 0.9 nm and 90% respectively. The insertion loss and the directivity from the amplifier 14 output to the monitoring WDM receiver 20 of the circulator 18 was 1 dB and 60 dB, respectively.

Figure 3:
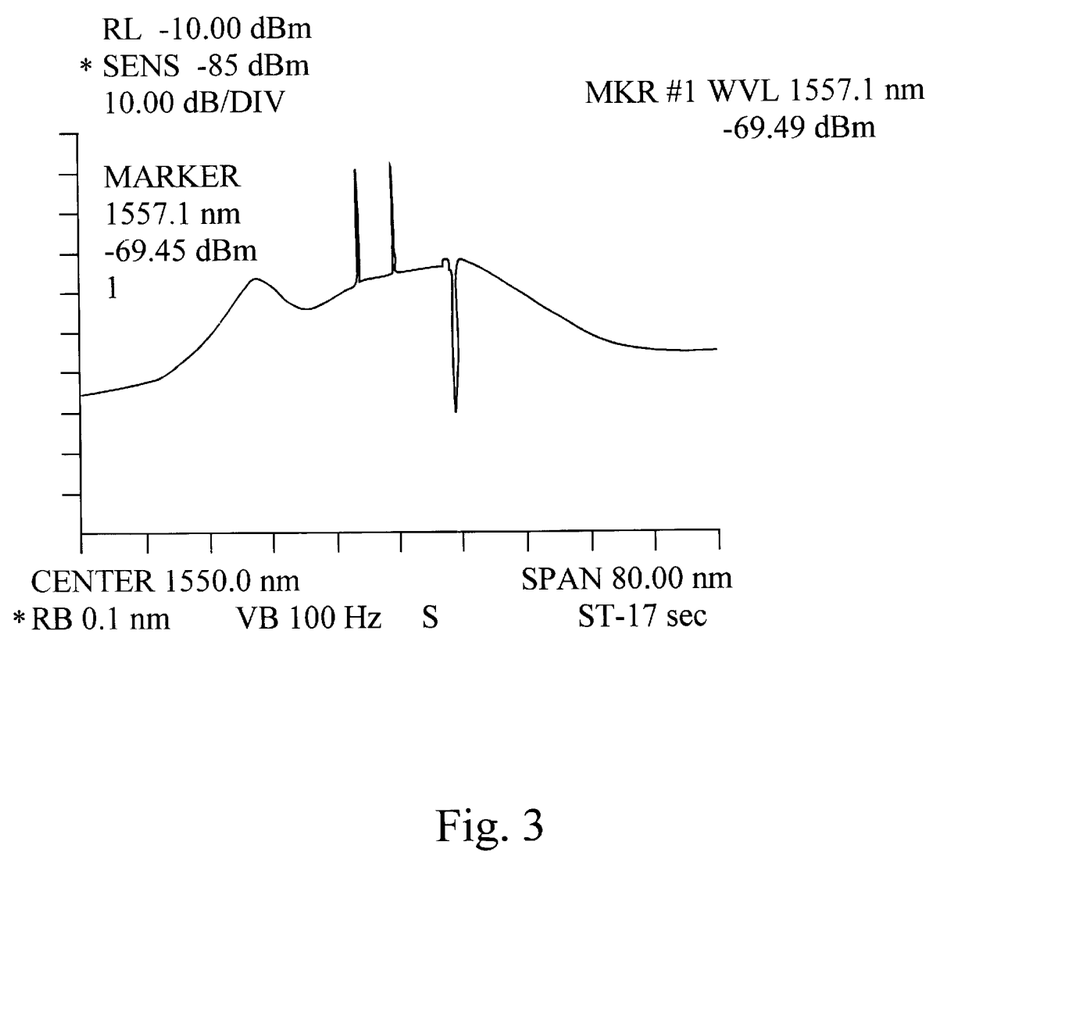
FIG. 3 is a graph of wavelength versus amplitude of the transmitted spectrum of branch 1 in a 1×4 stage PBON.
Figure 3A:
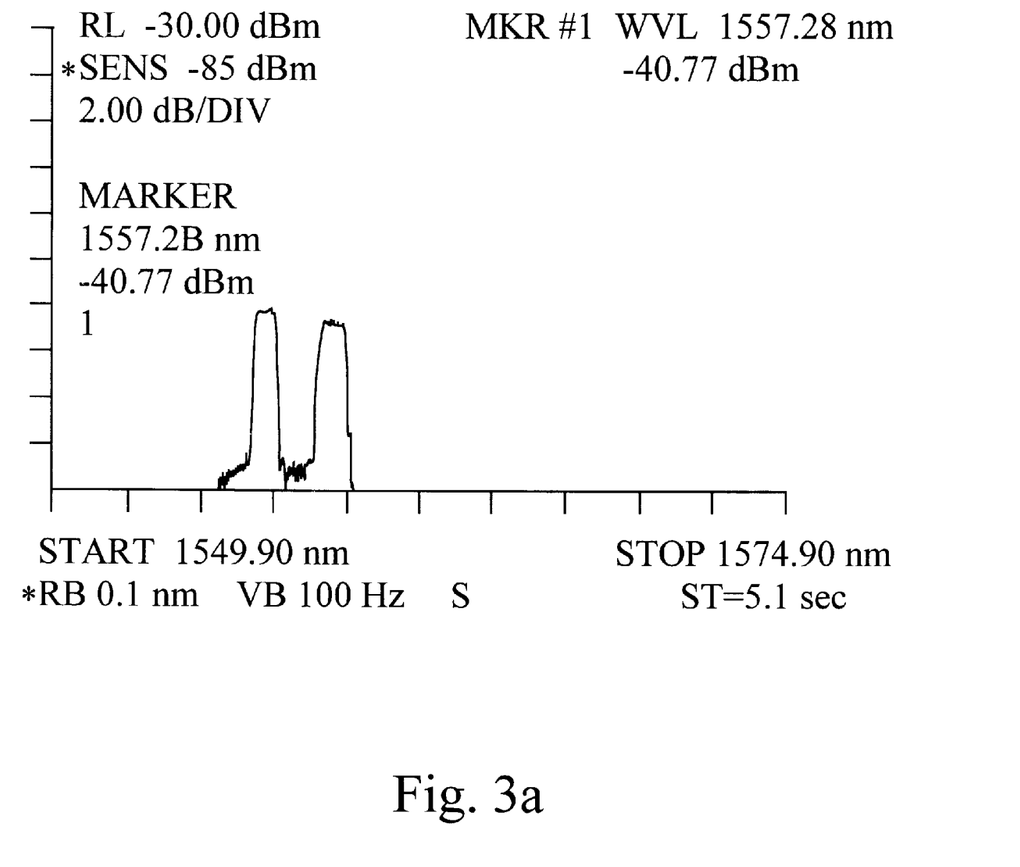
FIG. 3a is a graph of wavelength versus amplitude of the reflection spectrum wherein no faults are present in branch 1 and branch 2; and, FIG. 3b is a graph of wavelength versus amplitude of the reflection spectrum wherein branch 1 is broken to simulate a fault and no fault is present in branch 2.
Figure 3B:
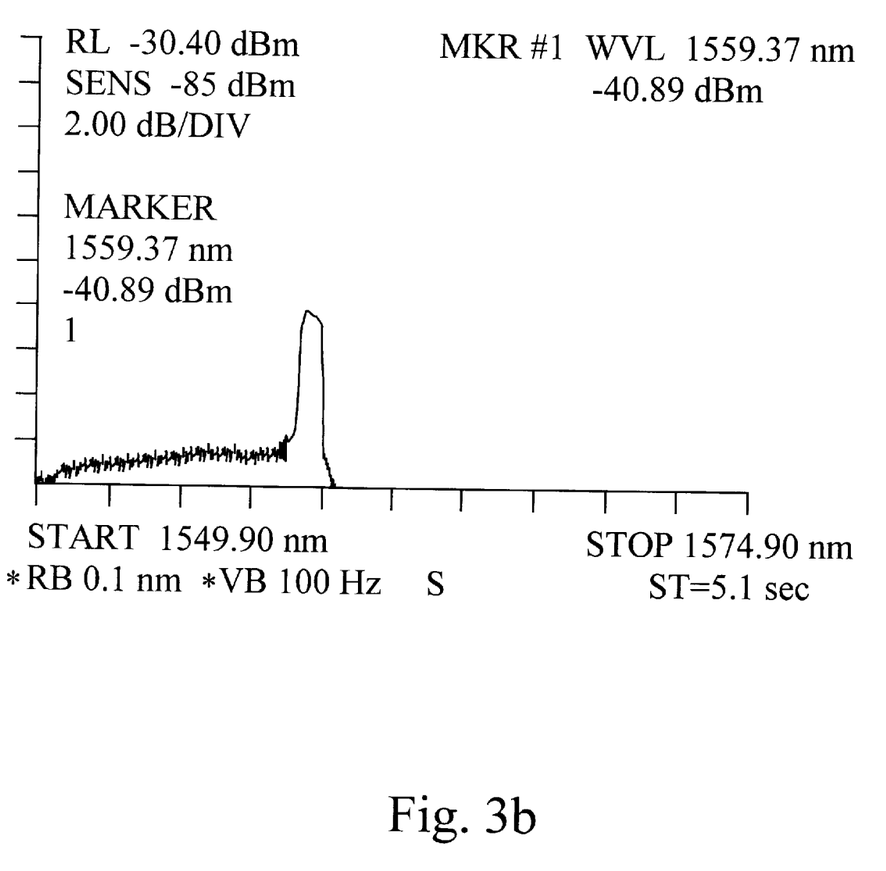

A signal was launched into input fibre 12, comprising two data channels at 1550 nm and 1545 nm with transmitted power 4 dBm prior to splitting. The output ASE power was approximately −20 dBm at the wavelengths $\lambda 1$ and $\lambda 2$. FIG. 3 shows the transmitted power at branch 1 after grating 22. The notch at a wavelength of $\lambda 1=1557.5$ nm indicates that the ASE power at this wavelength is reflected back to the circulator 18. FIG. 3a illustrates the reflected spectrum with no faults in either branch 1 or branch 2. ASE power at both wavelengths $\lambda 1$ and $\lambda 2$ is received at the circulator 18. As a means of simulating the fault identification process, the fibre of branch 1 was intentionally disconnected from the network and the reflected spectrum is shown in FIG. 3b. The drop in reflected power at $\lambda 1$ is about 6 dB at a wavelength of $\lambda 1$ received at the circulator port 3, indicating a fault at branch 1; and, residual ASE spectrum shown in FIG. 3b is due to the broadband back-scattered light from the fault.

Figure 1B:
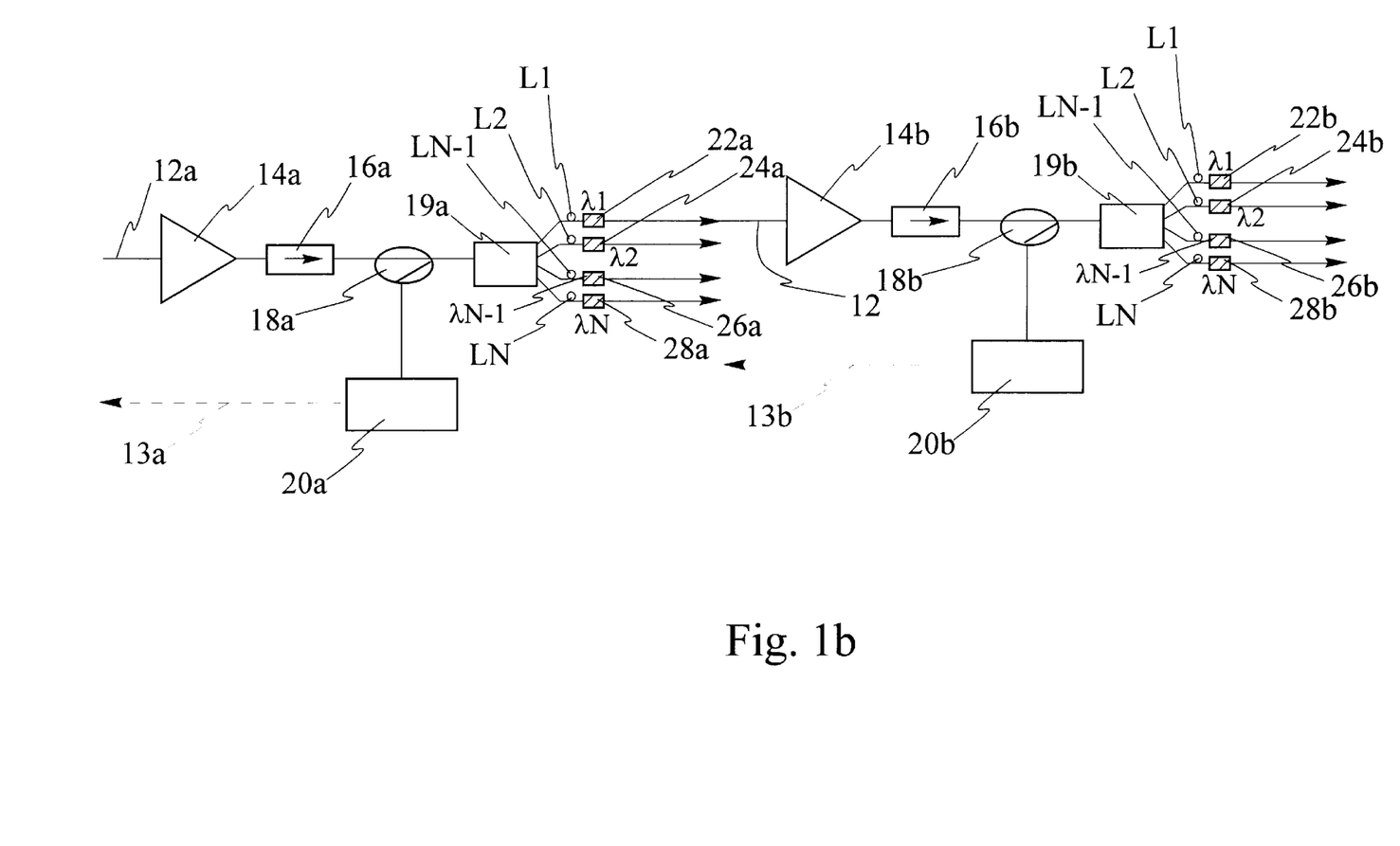
FIG. 1b is circuit diagram of a surveillance system of an M-ary tree-branched PBON.

The single stage 1×N PBON shown in FIG. 1a can be cascaded with a plurality of other stages as is shown in FIG. 1b. Here, an optical fibre trunk 12 includes a headend 8 with a plurality of data channels launched into the headend 8 having a first stage 10a cascaded with a second stage 10b. Of course, numerous other stages may be added. The monitoring information at each 1×N stage can then be transmitted back to network operators via telephone lines or on a specific subcarrier (SCM) in the upstream channel. Since the return path for each stage is independent by using the isolator or the circulator, the reflection wavelength of the FBG in different stages can be duplicated. Therefore, even with a limited number of test channels per stage due to the limited ASE spectrum, it is possible to implement a large number of monitoring channels in a large and expansive network. Conveniently, the circulator 18b prevents signals from traveling to an earlier upstream stage 10a. Since separate receivers 20a, 20b are used at each stage same Bragg fibre gratings can also be utilized, for example, grating 22a and 22b can have the same wavelength response, and similarly, gratings 24a and 24b can have the same wavelength response.

Figure 2:
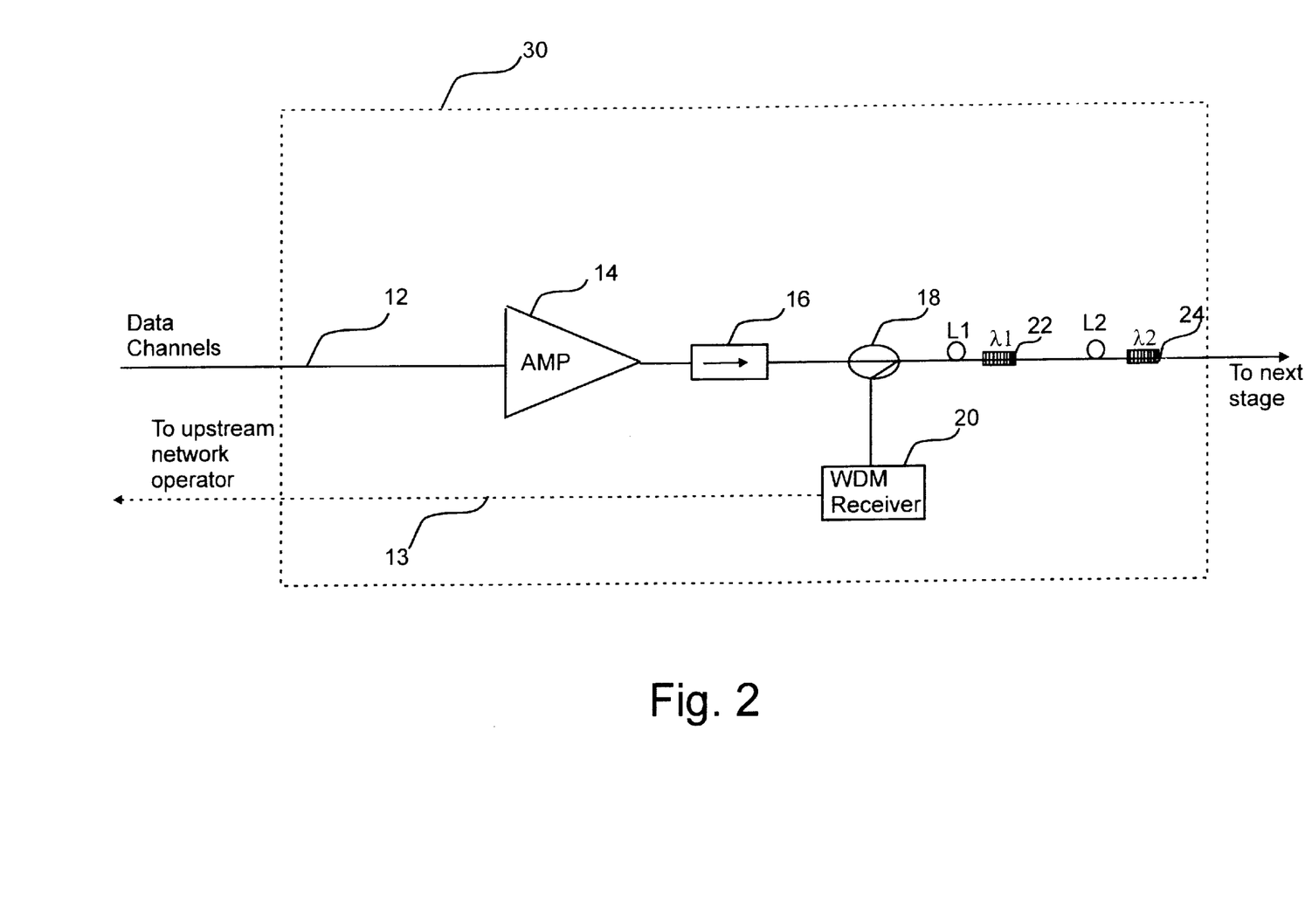
FIG. 2 is a circuit diagram of a single feeder optical system having Bragg gratings spaced along its length.

Turning now to FIG. 2, a single feeder configuration 30 is shown wherein a plurality of fibre Bragg gratings (FBGs) of different center wavelengths are used to locate a fault along the feeder. A first stage of an M stage single feeder comprises an EDFA 14 followed in series by an isolator 16 having a coupler or circulator 18 for directing data signals and ASE power from the amplifier to fibres L1 and L2 connected in series. FBGs 22 and 24 designed to reflect wavelengths of light of $\lambda 1$ and $\lambda 2$ are disposed after L1 and L2 respectively, along the light guiding path. If a fault is present between the circulator 18 and the FBG 22 the signal energy detected at the receiver 20 will be attenuated. The presence of full signal energy from the ASE at the wavelength $\lambda 1$ and attenuated energy at the wavelength λ2 indicates a fault between FBG 22 and FBG 24. If a fault exists between the FBG 22 and the FBG 24 signal energy of wavelength λ2 will be attenuated while energy at the wavelength λ1 will not be attenuated. As in the previous embodiments described heretofore, all of the ASE signals are extracted using an optical circulator or optical coupler and are detected by a detection means such as a WDM receiver. If the received ASE power at any designated monitoring wavelength deteriorates after certain time, or is below the detection limit, this indicates that there might be a fault or a progressive degradation at the corresponding fibre section or branch.

Design Considerations

The unused portion of the ASE spectrum of the EDFA 14 is approximately 25 nm which can accommodate about 10 monitoring or test wavelengths using FBGs with central wavelength separation of 0.8 nm and an individual passband of 0.5 nm. These values coincide with those of commercially available array waveguide demultiplexers that can be used in the receiver 20. In practice, for example in a communications system, it may be desirable to maximize the number of branches within a network and the fiber span of each branch so as to support more users and have a wider geographic coverage. Considering a 1×N stage system, the fiber span L of each branch can be expressed as $$L \leq \{P - 2C - 20 \log_{10} N + 10 \log_{10} R - D\}/2\alpha \text{(in km)} \qquad (1)$$

where P is the ASE power in dBm at the specific monitoring wavelength, N is the number of branches, C is the insertion loss of the circulator or the splitting loss of the coupler in dB, α is the fiber attenuation in dB/km, R is the reflectivity of the FBG, and D is the detection threshold of the monitoring receiver in dBm. In FIG. 5 a plot of L versus N for C=1 dB (using a circulator), R=95%, D=−50 dBm, α=0.2 dB/km and P=−20, −24, −28 dBm. For example, if L=20 km, the maximum N allowed is approximately 10 for a single stage. More branches consequently result in a shorter fiber span because of the increased splitting loss. For the single feeder instance, the maximum L is primarily limited by the fiber loss and the FBG insertion loss I and is given by $$L \leq \{P - 2C - 2(K-1)I + 10 \log_{10} R - D\}/2\alpha \text{(in km)} \qquad (2)$$

where K is the number of FBGs placed on the feeder.

Advantageously, this invention makes use of otherwise unused ASE power within a predetermined bandwidth available when commercially available optical amplifiers are used for amplification. However, although perhaps less economical, other constant broadband light sources may be envisaged for monitoring test wavelengths of light reflected from Bragg fiber gratings without departing from the spirit and scope of this invention.

Further, advantageously, this invention is particularly compatible with existing optical networks where insitu writing of gratings is possible. By writing or providing optical gratings within optical fibres that currently exist, a system is provided wherein fault detection is achievable. Of course, numerous other embodiments can be envisaged, without departing from the spirit and scope of the invention.

What is claimed is:

1. A method of monitoring an optical waveguide including one or more other waveguides, carrying a plurality of data channels and a plurality of test channels comprising the steps of:

a) providing a plurality of spaced apart in-line fiber Bragg gratings along the waveguide said fibre Bragg gratings having a different predetermined centre wavelengths for reflecting incident light at the different predetermined wavelengths, said different predetermined centre wavelengths corresponding to the test channels;

b) providing a broadband light source for providing a test signal comprising the different predetermined centre wavelengths corresponding to the plurality of test channels;

c) receiving light that has reflected backwards from the fibre Bragg gratings; and, d) determining if any of the received light that corresponds to any of the test channels is attenuated below a predetermined threshold, thereby indicating a fault.

2. A method of monitoring an optical waveguide as defined in claim 1, further comprising the step of providing an amplifier for amplifying the data channels, and for generating test signals corresponding to the test channels by utilizing an ASE (Amplified Spontaneous Emission) spectrum of the amplifier as the broadband light source.

3. In an amplified passive branched optical network having a plurality of optical branch paths, the branch paths each having a grating for passing traffic signal wavelengths of light and reflecting a unique other test wavelength of light, a surveillance method is provided for in-service fault identification, the method comprising the steps of:

monitoring the amplified passive branched network to detect the test wavelengths of light confined to an amplifier ASE (Amplified Spontaneous Emission) spectrum, wherein the test wavelengths of light are generated by the amplifier by ASE and are confined to its normally unused portion of spectrum, outside of the wavelengths of traffic signal wavelengths.

4. A method as defined in claim 3, wherein the step of monitoring the amplified passive branched optical network to detect the test wavelengths of light comprises the step of determining if the detected test wavelengths of light have a magnitude less than a predetermined threshold.

5. A system for fault identification in an optical network comprising:

a network of branched optical paths, the branched paths each having an in-line fiber grating for transmitting signal wavelengths and for reflecting other test wavelengths of light, at least some of the in-line fiber gratings having a different reflection spectrum than other of the gratings;

an optical amplifier at or near an input end of the network of branched optical paths, for amplifying at least some transmitting signal wavelengths and for generating a source of test wavelengths of light including a plurality of wavelengths within the reflection spectrum of the at least some gratings; and, means disposed between an output end of the amplifier and the network of branch paths for coupling test wavelengths reflected by the in-line fiber gratings out of the network for analysis.

6. A system as defined in claim 5, wherein the means for coupling test wavelengths is optically coupled to a WDM (Wavelength Division Multiplexing) receiver.

7. A system for fault identification in an optical network comprising:

a network of branch paths, the branch paths each having an in-line fiber grating for transmitting signal wavelengths and for reflecting other test wavelengths of light, at least some of the in-line fiber gratings having a different reflection spectrum than other of the gratings; and, means for transmitting signal wavelengths and for providing a broadband source of other wavelengths of test light including a plurality of wavelengths within the reflection spectrum of the at least some gratings.

8. A system as defined in claim 7, further comprising means for receiving and detecting the test wavelengths of light.

* * * * *